(12) United States Patent
Burtan Arkan et al.

(10) Patent No.: US 9,873,418 B2
(45) Date of Patent: Jan. 23, 2018

(54) NON DETACHABLE BODY CONNECTION SYSTEM WITH CONNECTION RING FOR EMERGENCY BRAKE CYLINDERS

(71) Applicant: ARFESAN ARKAN FREN ELEMANLARI SANAYI VE TICARET A.S, Kocaeli (TR)

(72) Inventors: Fuat Burtan Arkan, Kocaeli (TR); Yavuz Battal, Kocaeli (TR); Omer Kulac F., Kocaeli (TR)

(73) Assignee: ARFESAN ARKAN FREN ELEMANLARI SANAYI VE TICARET A.S., Kocaeli (TR)

( * ) Notice: Subject to any disclaimer, the term of this patent is extended or adjusted under 35 U.S.C. 154(b) by 535 days.

(21) Appl. No.: 14/400,335

(22) PCT Filed: May 10, 2013

(86) PCT No.: PCT/TR2013/000189
§ 371 (c)(1),
(2) Date: Nov. 11, 2014

(87) PCT Pub. No.: WO2013/169219
PCT Pub. Date: Nov. 14, 2013

(65) Prior Publication Data
US 2015/0104242 A1 Apr. 16, 2015

(30) Foreign Application Priority Data

May 11, 2012 (TR) .............................. a 2012 05517

(51) Int. Cl.
*B60T 17/08* (2006.01)
*B21D 39/02* (2006.01)
*B21D 51/16* (2006.01)

(52) U.S. Cl.
CPC ............ *B60T 17/088* (2013.01); *B21D 39/02* (2013.01); *B21D 51/16* (2013.01); *B60T 17/083* (2013.01); *Y10T 403/475* (2015.01)

(58) Field of Classification Search
CPC ....... B21D 39/02; B21D 51/16; B60T 17/083; B60T 17/088; Y10T 403/3941; Y10T 403/475

(Continued)

(56) References Cited

U.S. PATENT DOCUMENTS

| 4,109,350 | A | * | 8/1978 | Acre | ....................... B60T 17/08 24/20 EE |
| 5,067,391 | A | * | 11/1991 | Choinski | ............... B60T 17/083 29/521 |
| 5,775,202 | A | | 7/1998 | Plantan | |

FOREIGN PATENT DOCUMENTS

| AU | 639676 B2 | 8/1993 | |
| DE | 102005053674 A1 | * 7/2006 | ............. B21D 39/04 |
| DE | 102008053459 A1 | 4/2010 | |

OTHER PUBLICATIONS

"Zinc Plating—The Corrosion-Prevention Workhorse." Infinitech Finishing. Nov. 15, 2010, [online], [retrieved on Jul. 4, 2017] Retrieved from the Internet <URL: https://web.archive.org/web/20101115103437/http://www.infinitechfinishing.com/Articles/Article7.htm>.*

* cited by examiner

*Primary Examiner* — Josh Skroupa
(74) *Attorney, Agent, or Firm* — Gokalp Bayramoglu

(57) ABSTRACT

A non-detachable body connection with a connection ring which enables the non-detachable connection of the upper body located at the service part of the emergency brake cylinders used in the airbrake systems of heavy weight vehicles and the lower body parts located at the emergency (Continued)

section by using an additional piece during the coupling with adapter plate.

11 Claims, 13 Drawing Sheets

(58) Field of Classification Search
USPC .................................................. 403/193, 269
See application file for complete search history.

NON DETACHABLE BODY CONNECTION SYSTEM WITH CONNECTION RING FOR EMERGENCY BRAKE CYLINDERS

TECHNICAL FIELD OF THE INVENTION

The present invention is related to a non-detachable body connection with a connection ring which enables the non-detachable connection of the upper body located at the service part of the emergency brake cylinders used in the airbrake systems of heavy weight vehicles and the lower body parts located at the emergency section by using an additional piece during the coupling with an adapter plate.

BACKGROUND

The emergency brake cylinders used in airbrake systems of heavy weight vehicles are divided into two groups as diaphragm-diaphragm type and diaphragm-piston type.

The body connection subject to the present invention is a non-detachable connection which enables the upper body and the lower body used in emergency brake cylinders which are diaphragm-diaphragm type or diaphragm-piston type, to be connected to each other non-detachably.

The emergency brake cylinders used in heavy commercial vehicles such as trucks, trailers, lorries and buses, comprise a service brake chamber (5), which is in engaged when brakes are used in normal driving conditions. And an emergency chamber (4) which is engaged when there is an air leakage or when the hand break is used.

When the vehicle is desired to be slowed down or stopped, the service chamber (5) is operated. When the vehicle is desired to be stopped and fixed the emergency chamber (4) is operated. In other words when a force is applied to the footbrake, the service chamber (5) is engaged and when the hand brake is used the emergency chamber (4) is engaged.

The diaphragm is the bottom part of the emergency brake cylinder formed as a result of the connection in any way of the adapter plate (1), the emergency body (2) and the emergency chamber (4) in emergency brake cylinders with piston type. Further, it has a strong emergency spring (11) and piston (12) placed inside the emergency body (2).

A general structure of the diaphragm-piston emergency brake cylinder having a bolted emergency body (2) is shown in "FIG. 1". When the vehicle is moving, the emergency chamber (4) continuously contains pressurized air. The pressurized air is located at the upper part of the piston (12) and the pressurized air enables the compressing of the emergency spring (11). When pressure is decreased in the cylinder, or when the vehicle slows down or stops (when the hand brake is pulled up), the air pressure on the piston (12) is decreased or is completely eliminated. In such case, the additional spring (11) will not be compressed by the piston (12). And after the spring is released, the pressure is passed on to the shaft located in service chamber (5) via the piston pipe and from here to the wheels via the brakes system of the vehicle.

The strong emergency spring (11) is located between the piston (12) and the emergency body (2) within the emergency chamber of the emergency brake cylinders necessitates that the usage and storage conditions are highly safe. When intervention is carried out without precaution dangerous situations will arise. In order to eliminate dangerous situations and to prevent unauthorized measures or/measures without precaution, an example for the improved connection types is shown in "FIG. 2".

Several methods are used for the connection of the bodies (2 and 3) in the state of the art. With such methods, each chamber is combined one by one. Clamp attachment (25) is one of these methods. Another method is the connection type, wherein the connection of the adapter plate (1) and the emergency body (2) is provided by the peripheral bolts (6) and these are shown in FIG. 2, FIG. 3 and FIG. 4". In such a connection type, holes in regular distances around the peripheral of the connection surface of the emergency body (2) and the adapter plate (1) have been opened. The connection between the adapter plate (1) and the emergency body (2) is provided by means of the bolts (6) placed in the screw sockets, following the reciprocally combining of the said screw sockets with the holes.

Another connection type in the known state of the art is the connection established by forming the parts. This kind of connection type shown in "FIG. 1" has also been described in the patent application numbered WO 2008/027018 A1.

The skirt parts of the emergency body (2) located at the emergency chamber (4) side in such a connection type, inclines over the adapter plate (1) under F force and forms a non-detachable connection. However, this type is only applied for an emergency chamber (4).

Another connection type in the known state of the art has been described in the patent applications numbered WO 2008/027018 A1 and WO 2009/075659 A2. In this type of connection, the skirt sections of the emergency body (2) which has a chamber (4) near the emergency section, enters into the adapter plate (1) and the aluminium clamp having protrusions, is placed into its reciprocating socket within the adapter plate (1) and said protrusions are brought on top of each other and the strong insertion connection of the aluminium protrusions are carried out.

Another connection type again in the known state of the art is described in the patent application numbered WO 2010/0049021 A1. In this type of connection, concave forms are established by the regionally pressing of the skirt sections of the emergency body (2) into the cavities on the adapter plate (1) by means of the force applied from the outside towards the center by covering the adapter plate (1) with the emergency body, thus a non-detachable connection for only the emergency chamber (4) is formed.

According to another connection type again in the known state of the art as shown in the figures of the application numbered DE 19830154 A1, the connection is made of 2 additional pieces which provide connection by containing the skirt sections of the emergency (2) and service bodies (3) and which shall surround the periphery of the adapter plate (1) following the placement of the emergency (2) and service bodies (2) on both sides of the adapter plate (1) of the service (5) and emergency chambers (4). This type of clamp formed with two pieces, is connected with bolts (6) following installation and thus a detachable connection is formed inside both chambers (4 and 5).

Yet according to another connection type used in the known state of the art according to the application numbered DE 3404014 A1, the connection is connected in a detachable manner via a clamp (25) and the service body (3) is placed together with the diaphragm following the placement of the emergency body (2) inside the adapter plate (1) by producing the emergency body (2) as a long and staged way.

The connection which cannot be detached in one motion of the service chamber (5) and the emergency chamber (4) described in a method in the state of the art in documents numbered DE 20021393 U1 and WO 2006/066832 A1 in the known state of the art, is formed such that the service (5) and emergency chambers (4) cannot be detached in one go, as they are formed by shaping one of the emergency chamber (4) or service chamber (5) bodies (2 and 3) such that one of them shall enclose the other. In this invention the body itself is shaped, and as it encloses the adapter plate and as it is locked by forming the tips by reaching over the other body, the time to produce it is longer.

In the patent numbered DE 20021393 U1 it is enabled to establish a non-detachable connection in one motion by bending with a mould over the service body (3) of the emergency body (2). In the abovementioned patents and in the inventions within the known state of the art, in order for the non-detachable connections to be resilient enough, provided by shaping bodies, the body that has been shaped, needs to be covered by a coating which is resilient against abrasion and corrosion.

In the patent numbered WO 2006/066832 A1 such a coating has been used.

According to the connection method in the known state of the art described again in the same patent document, it is necessary for the 2 air connections to be separately mounted as additional pieces which are located in the adapter plate (1) due to the dimension of the body which encloses the adapter plate (1).

According to the patent numbered U.S. Pat. No. 6,405,636 B1 in the known state of the art, the non-detachable body connection is only used for the emergency chamber (4) and in diaphragm-diaphragm type emergency brake cylinders.

SUMMARY

The main object of the present invention is to develop a detachable connection type which has screws (6) and clamps (25) carried out between the adapter plate (1) and the emergency body (2) and the service body (3) and to convert said detachable connection type into a non-detachable connection type.

Together with this according to the invention subject to the application, different to the known state of the art represented with "FIG. 2", the non-detachable connection for diaphragm-piston type brake cylinders, the emergency chamber (4) alone or both the emergency chamber (4) and the service chamber (5) an additional connection ring (7) can be used.

In the case that the non-detachable connection is carried out by means of the additional connection ring (7), the cylinder safety can be increased by ensuring standardization in compliance with air connections having different air connection threads (15) with a universal and changeable air connection adapter (9) according to connection ring types "FIGS. 12A-12E" which has various sized connection rings; In order to ensure the non-detachable connection in one motion of the emergency chamber (4) and the service chamber (5) having different dimension sizes.

By developing the non-detachable body connection applied for diaphragm-piston type emergency brake cylinders improved according to this invention, the object is show as below:

The disassembly of both the emergency (2) and service bodies (3) is prevented, and situations which may be dangerous to human health that could arise due to authorized or unauthorized interventions are eliminated.

Establishing the non-detachable connection which was established for the emergency chamber (4) by means of the connection ring (7) of the brake cylinder used, for the service chamber (5) too thus improving the non-detachability feature.

Providing non-detachable connection with a single operation for the service (5) or emergency chambers (4) which have different dimension sizes that cannot be met according to the non-detachable connection system in one motion of both the service chamber (5) and the emergency chamber (4) in the known state of the art where it is known that the dimension sizes are the same.

Providing cost advantage and elasticity by using standard pieces.

Decreasing the usage of zinc by coating only the connection ring (7) in zinc based baths instead of processing with coating that contains zinc and/or zinc nickel based passivation applied to the whole of the body in order to shape with a mould or cylinder to achieve non-detachable connection for any of the bodies of the brake chambers (2 and 3).

Decreasing costs by decreasing the usage of zinc and protecting the ecosystem.

Providing an easily adaptable characteristic to the product by means of the one piece air connection adapter (9) comprising the new two air connections and thus providing flexibility in terms of product variety.

Making the installation process easier by eliminating the usage of parts such as clamps, screws and bolts according to the clamped and screwed connection method.

Increasing corrosion resistance.

Lifting the coating on the adapter plate (1) by means of increasing corrosion resistance.

Eliminating the need for coating by isolating the adapter plate (1) from external effects.

Being able to use composite materials too by means of the change provided in the form of the adapter plate (1).

BRIEF DESCRIPTION OF THE DRAWINGS

The figures that have been prepared in order to further explain the diaphragm-piston type emergency brake cylinders improved with the present invention have been described below.

Figure 1:
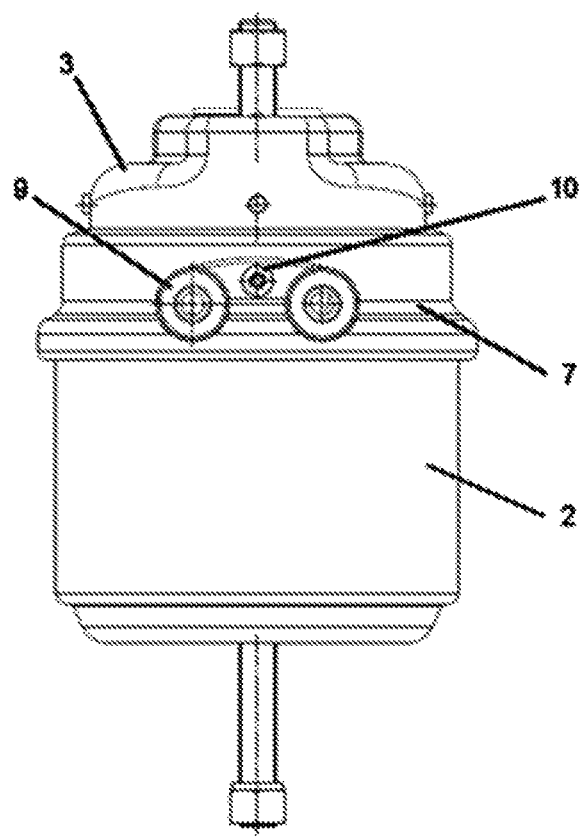
FIG. 1 is the side view of the non-detachable body connection with a connection ring subject to the invention

The parts, elements and pieces in the prepared figures, in order to further explain the non-detachable body connection in emergency brake cylinders carried out according to the present invention, have each been numbered and the references of said numbers have been listed below:

1. Adapter plate
2. Emergency body
3. Service body
4. Emergency chamber
5. Service chamber
6. Body connection screw
7. Connection ring
8. Integrated air inlets
9. Air connection adapter
10. Air connection adapter fixing screw
11. Emergency spring
12. Piston
13. Diaphragm
14. O-ring
15. Air connection thread
21. Air connection sockets
22. Upper mould
23. Lower mould
24. Form spool
25. Clamped connection

DETAILED DESCRIPTION

Figure 2:
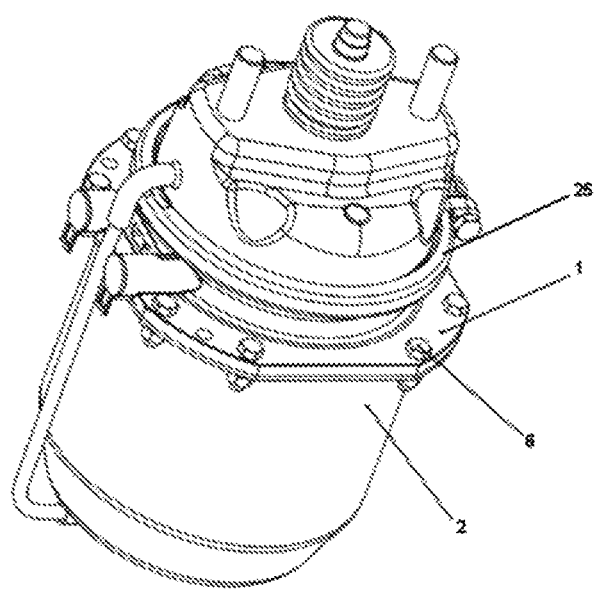
FIG. 2 is the perspective view of the emergency brake cylinder with detachable connection (Prior Art)
Figure 3:
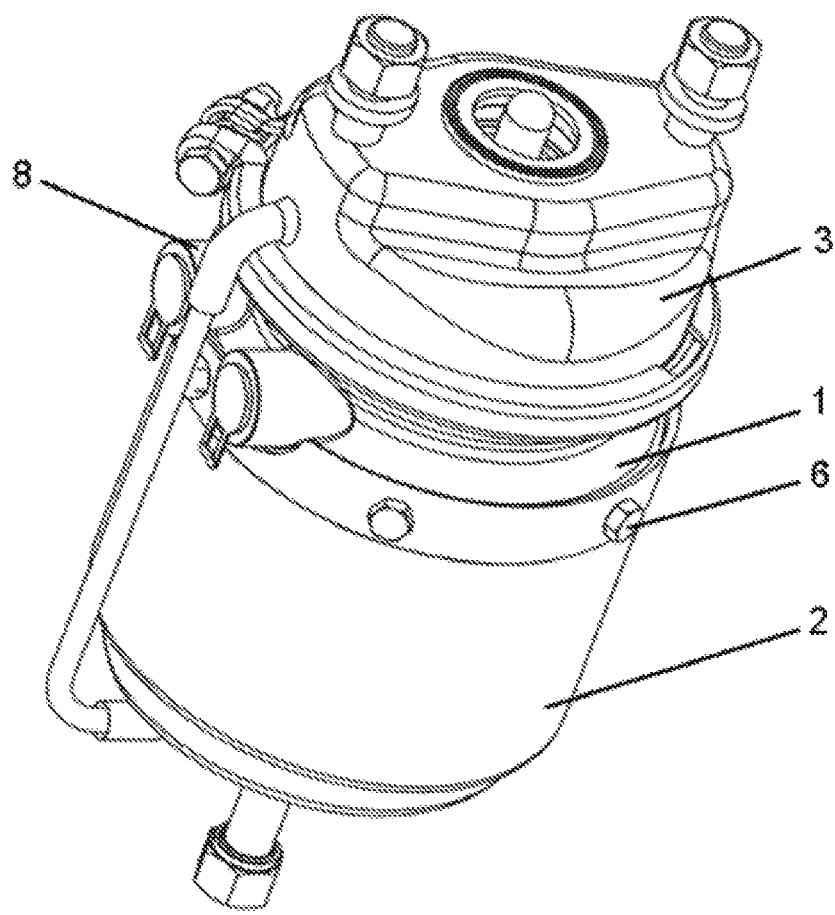
FIG. 3 is the perspective view of the emergency brake cylinder with detachable connection (Prior Art)
Figure 4:
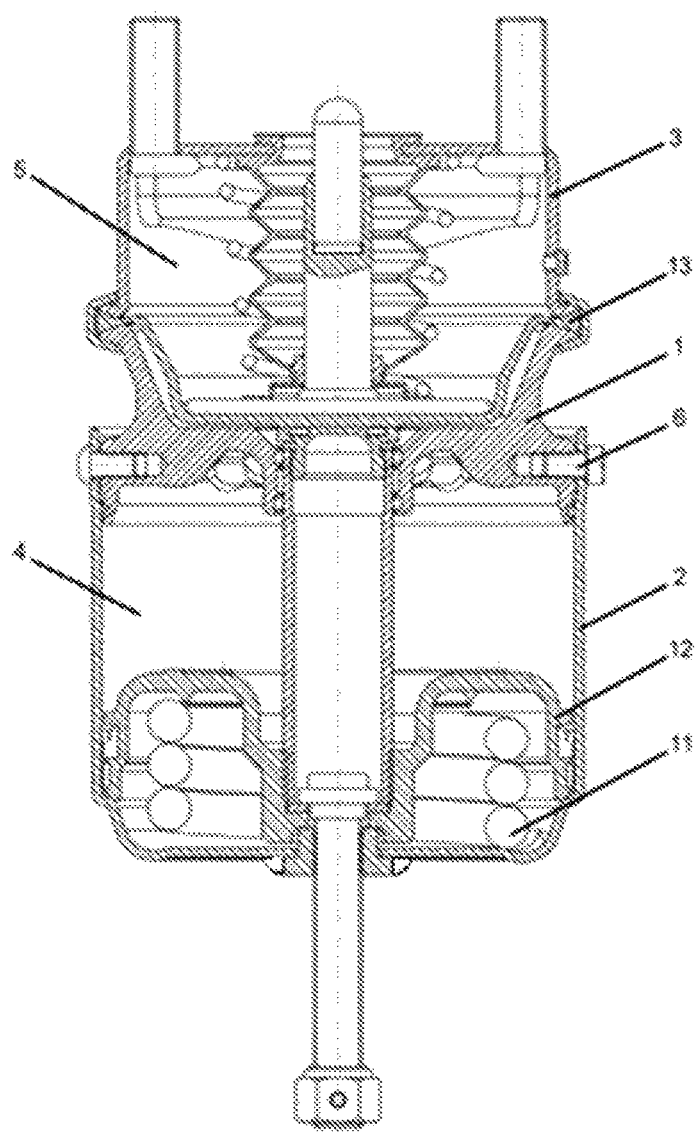
FIG. 4 is the sectional view of the emergency brake cylinder with detachable connection (Prior Art)
Figure 5:
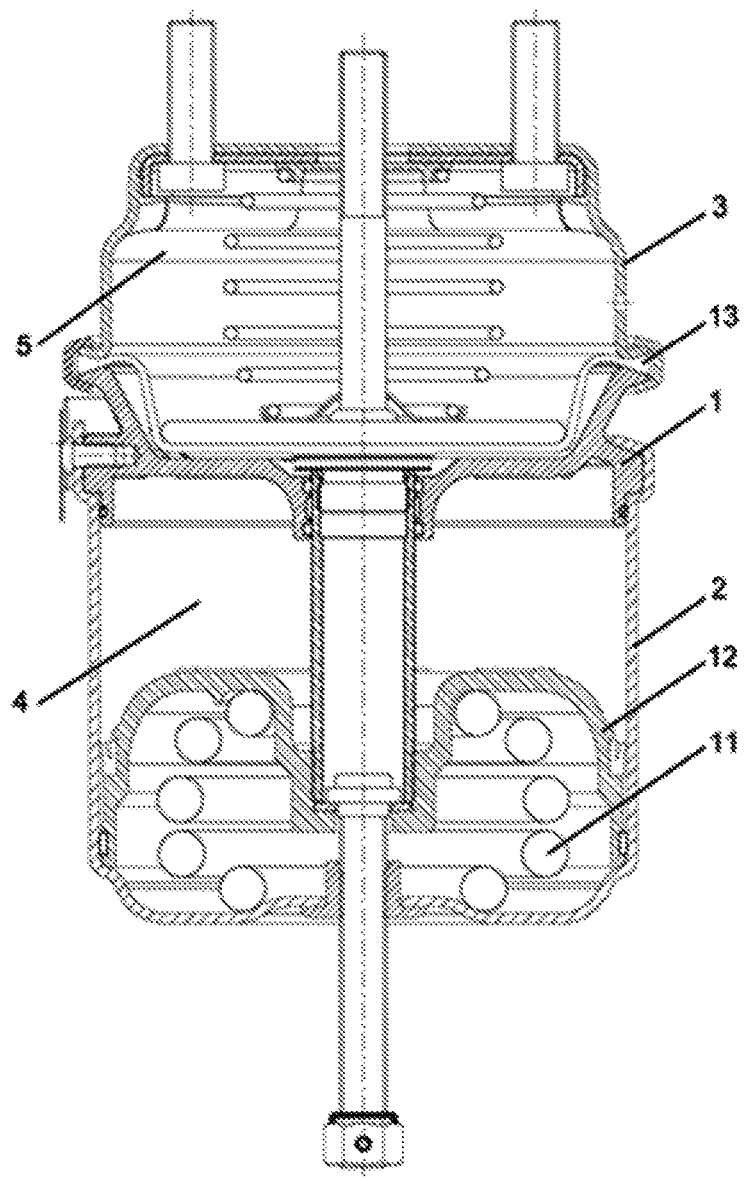
FIG. 5 is the sectional view of the emergency brake cylinder with emergency chamber non-detachable connection (Prior Art)
Figure 6:
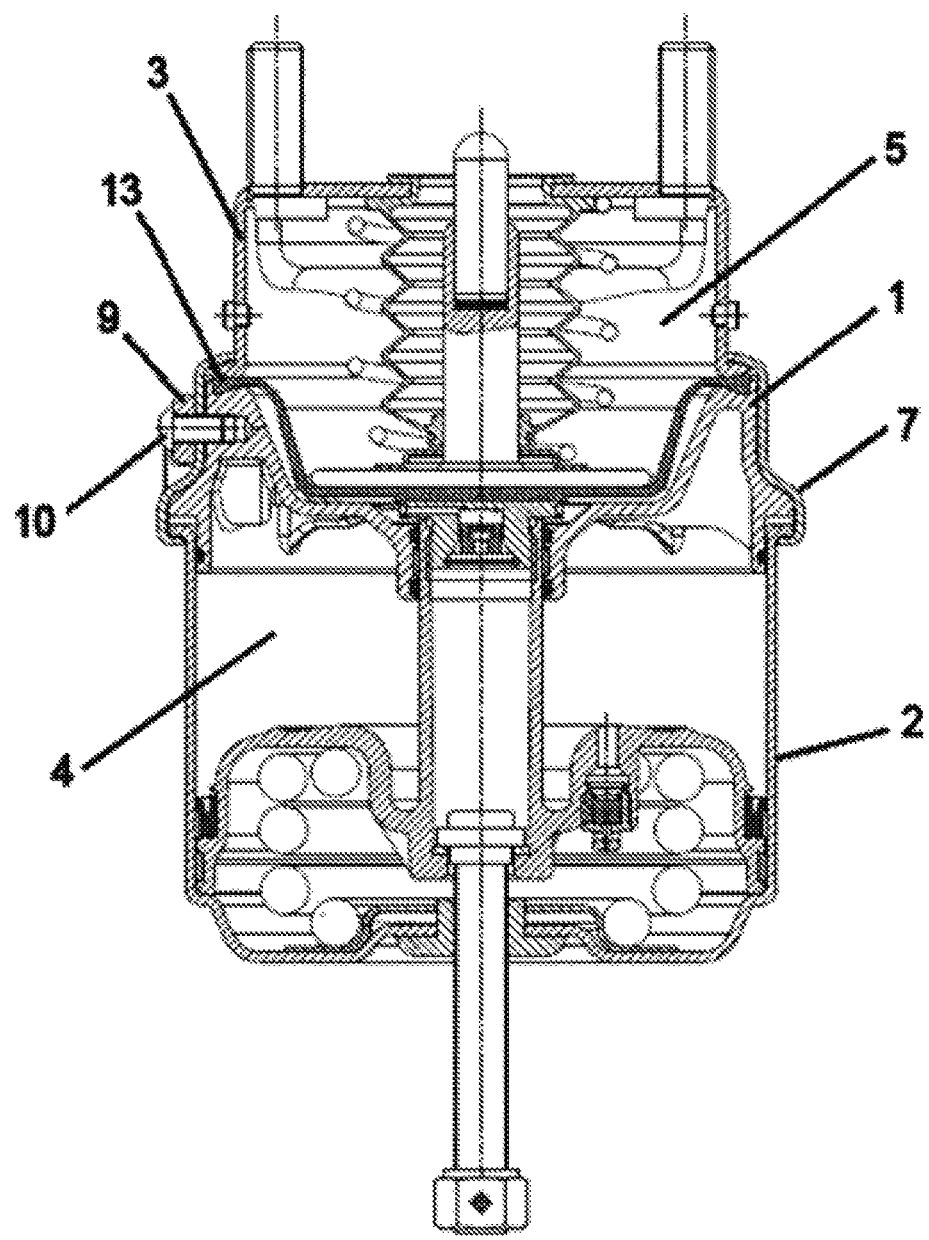
FIG. 6 is the sectional view of the non-detachable body connection with connection ring subject to the invention
Figure 7:
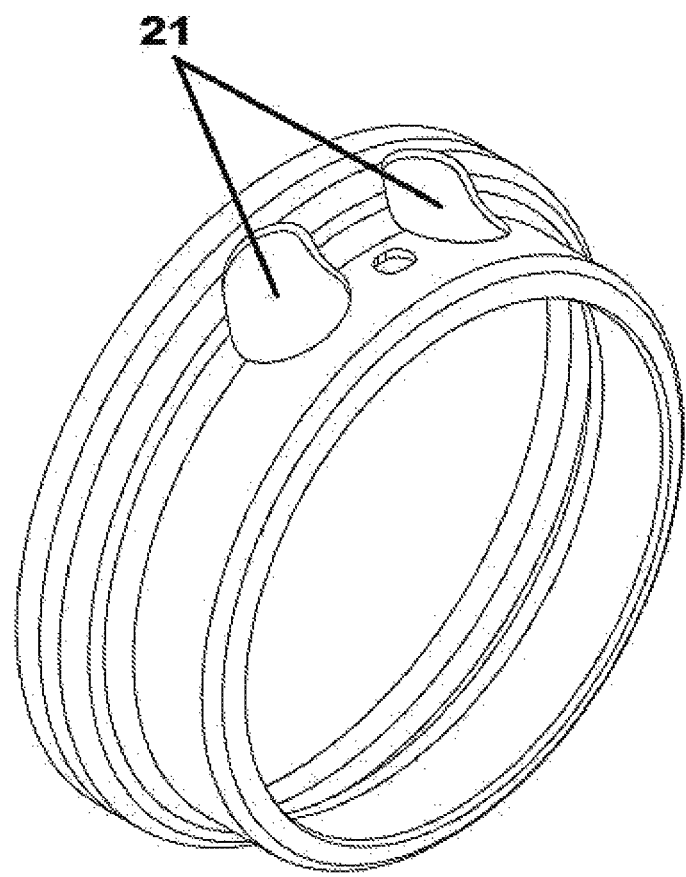
FIG. 7 is the perspective view of the connection ring.
Figure 8:
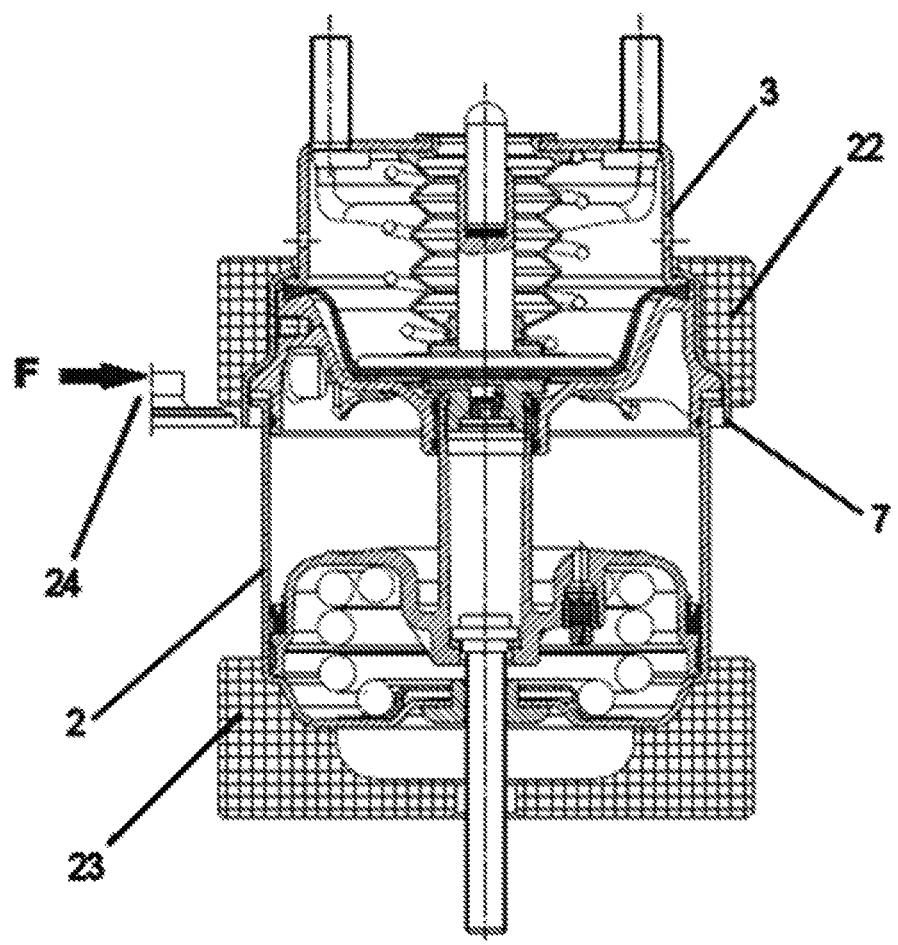
FIG. 8 is a general view of the application of the production method of the non-detachable body connection with a connection ring subject to the invention
Figure 9:
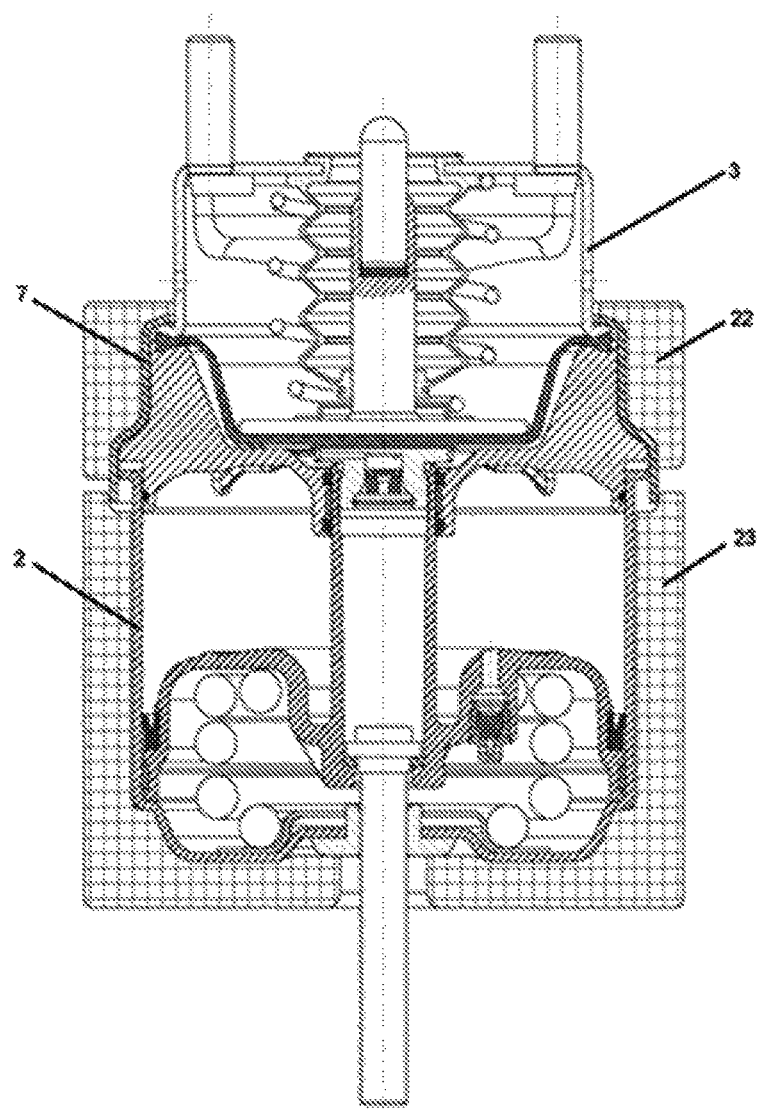
FIG. 9 is another general view of the application of the production method of the non-detachable body connection with a connection ring subject to the invention.

The detachable connections used in the diaphragm-piston type emergency brake cylinders in the known state of the art are shown in "FIGS. 2, 3, and 4".

The detachable connection between the emergency body (2) and the service body (3) in the known state of the art is provided by means of connection screws (6).

The emergency spring (11) in emergency cylinders is compressed with pressurized air sent to the emergency chamber (4). This spring (11) is released when the air inside the emergency chamber (4) is discharged, thus providing the necessary force needed for braking. As the braking force is provided by the emergency spring (11) this spring has a high force value and for this reason the body connection needs to be very strong.

According to the invention subject to the application the emergency body (2) and the service body (3) in emergency brake cylinders are coupled by means of the connection ring (7) and thus a non-detachable body connection is formed.

In addition to this, according to the invention subject to the application, the connection ring (7) can also enable the non-detachable connection alone for the emergency chamber (4) also in diaphragm-piston type brake cylinders.

As the connection ring (7) can be shaped as desired by means of a roll form spool (24) under pressure or by means of the lower and the upper moulds (22,23), even though the service chamber (5) and the emergency chamber (4) have different dimensions, they can be non-detachably connected with a single operation.

Together with this, depending on the application type of the invention, a connection ring (7) which has not been subjected to a prior shaping process can be used as well as a connection ring (7) which has been subjected to a prior shaping process.

During the formation of the non-detachable body connection developed according to the invention subject to the application, a connection ring (7) is placed on the service body (3) where the emergency body (2) connects with the adapter plate (1) and following the installation of the adapter plate (1) on the emergency body (2) both bodies (4 and 5) are connected, a force is applied to the connection ring (7) by means of the lower and upper moulds (22 and 23) or a force is applied from the bottom by means of the form spool (24) present inside the mould that combined upper and lower moulds (22-23) and as a result the connection ring (7) is bent and shaped and a non-detachable connection is provided by enabling the curving of the connection ring (7) over the emergency (2) and service bodies (3). This non-detachable connection provides impermeability at the same time.

According to the basic application of the non-detachable body connection developed by means of the invention subject to the application the body connection is established by a moulding connection method.

According to this method a connection ring (7) which has been pre-shaped is used and said method comprises the below mentioned steps;

Installing the emergency (4) chamber after its inner components are mounted, on the lower mould (23) together with the adapter plate (1) which has been installed on top.

Placing the service chamber (5) on the connection ring (7) which has a higher dimension after the inner components of the said chamber have been mounted.

Placing the service chamber (5) which had been placed on the connection ring (7) on the upper mould (22), Placing the diaphragm (13) on the adapter plate (1) located inside the emergency chamber (4) placed within the lower mould (23), Placing the service chamber (5) located within the upper mould (22) on top of the diaphragm (13) which is located on the emergency chamber (4) within the lower mould (23), and Applying force by means of the upper mould (22) thus shaping the connection ring (7) to bend over the emergency (2) and service bodies (3).

According to another application of the non-detachable body connection improved according to the invention subject to the application, the body connection is established with the form cylinder coupling method.

This method is different from the moulding connection method in terms of using a connection ring (7) which has not been subjected to a pre-shaping process and comprises the following process step:

Following the placement of the emergency chamber (5) within the upper mould (22) over the diaphragm (13) located on the emergency chamber (4) within the lower mould, the mould that combined upper and lower moulds (22-23) turns around its own axis at a certain cycle and at the mean time the form spool (24) which can move at a linear direction bends the skirt section of the connection ring (7) towards the emergency body (2) and shapes the connection ring (7) by carrying out this bending action.

As it can be seen in FIG. 1, the air inlets (8) in the known state of the art are integrated over the adapter plate (1) as protrusions.

However according to the application subject to the invention the relation of the air inlets (8) are cut off from the emergency body (2) and are placed on the adapter plate (1) as slots. The single piece air connection adapter (9) which comprises both air connections are fixed by means of an addition air connection adapter fixing screw (10) following the mounting of the connection ring (7) having connection slots (21) for the air connection adapter (9).

According to the known state of the art, in non-detachable connections established by forming the bodies, usually all of the emergency body (2) is coated with a zinc based coating which is resistant to abrasion and corrosion, however in the invention subject to the application only the connection ring (7) is coated and the emergency body (2) is coated with non-galvanized methods such as powder paint. Thus, the coating costs are decreased and the environmental damages caused by the coating chemicals are also minimized.

The clamp (25), body connection screw (6), nuts and additional components such as delimiters used in the clamped connection type used in the known state of the art during the mounting of the service chamber (5), make the installation process harder and longer. For this reason, the development of the formed connection type carried out by using and additional single component is highly beneficial in terms of shortening the installation time, in terms of user safety and corrosion.

Figure 10:
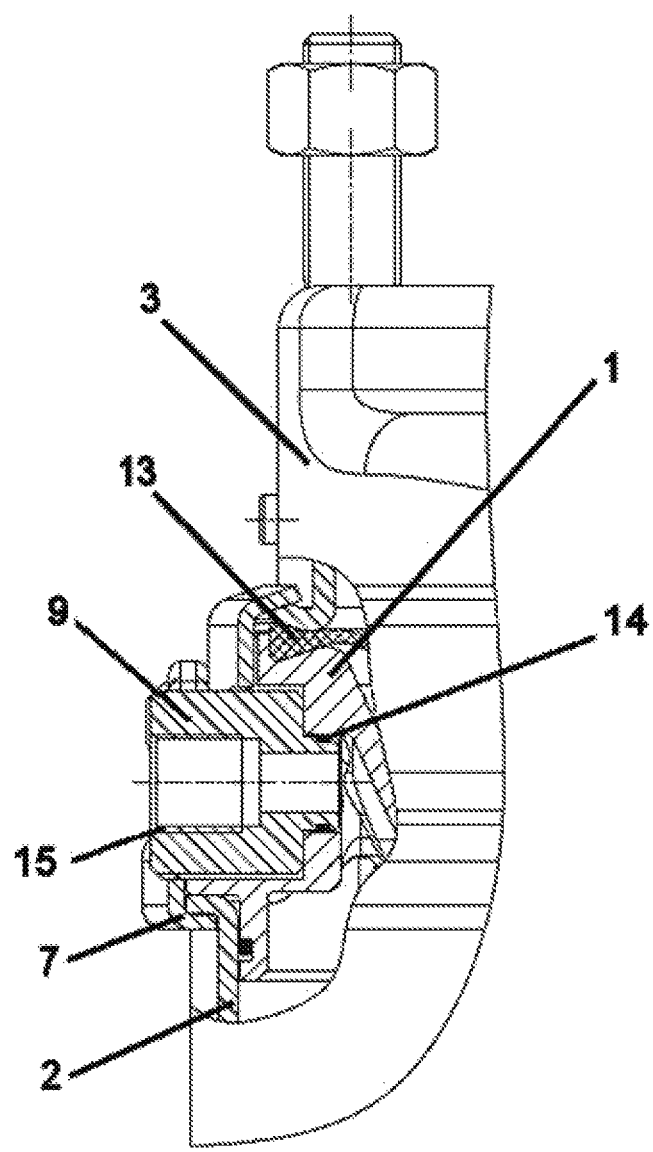
FIG. 10 is the sectional view of the non-detachable air inlet connection adapter with a connection ring subject to the invention.
Figure 11:
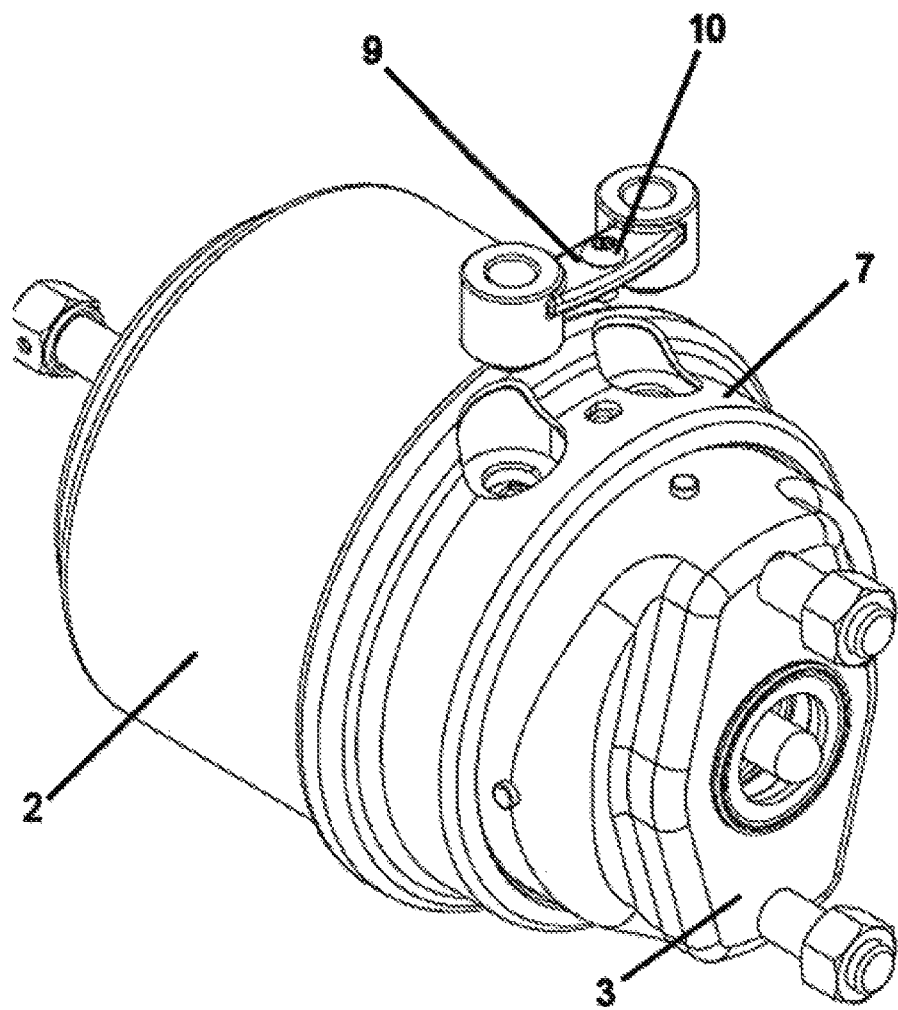
FIG. 11 is the mounted view of the non-detachable air inlet connection adapter with a connection ring subject to the invention.
Figure 12A:
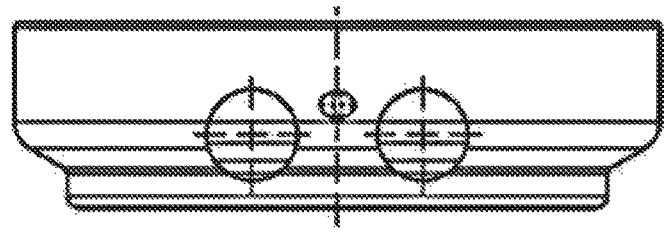
FIG. 12A, FIG. 12B, FIG. 12C, FIG. 12D and FIG. 12E are the side view of the emergency chamber and service chamber of the connection ring belonging to the non-detachable body connection with a connection ring subject to the invention for combinations where the measurements of the emergency chamber and the service chamber are the same or different from each other.
Figure 12B:
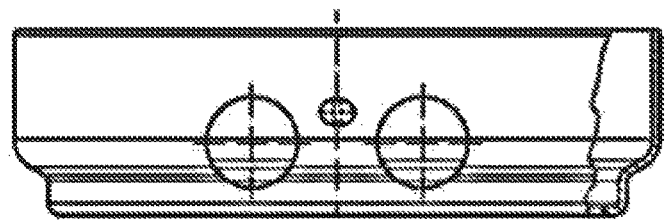
Figure 12C:
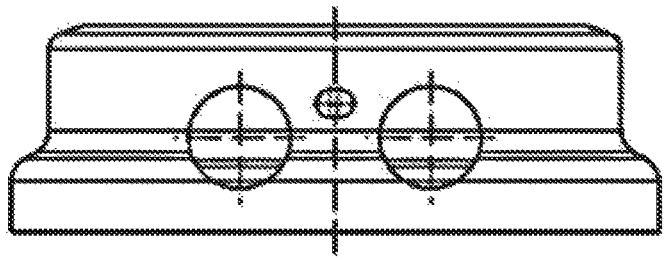
Figure 12D:
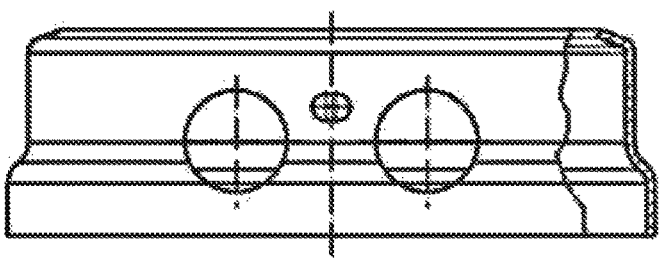
Figure 12E:
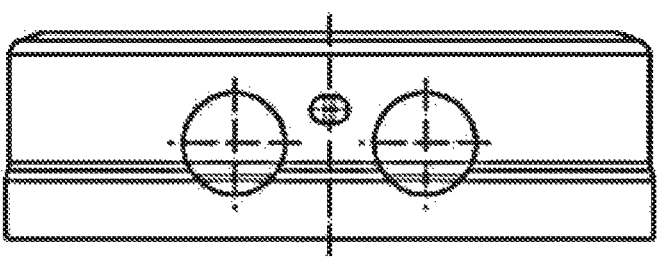
Figure 13:
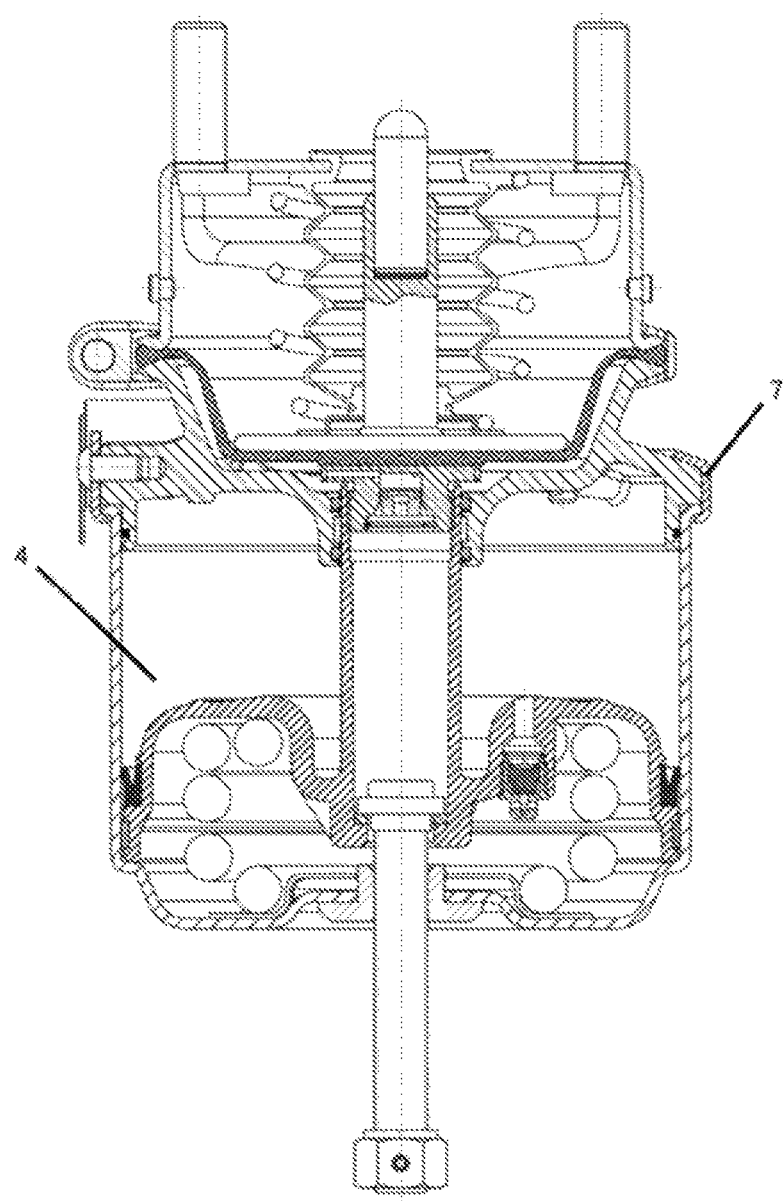
FIG. 13 is the sectional view for the non-detachable connection application of only the emergency chamber non-detachable body connection with a connection ring subject to the invention.

As it can be seen in FIG. 10, the air inlet adapter (9) is detachable such that the connection ring (7) can be shaped by the forming spool (24) and/or by the upper and the lower moulds. The O-ring (14) integrated with the air connection adapter (9) leans on the air inlet hole surface and provides impermeability. The air connection adapters (9) are produced as a single piece and are fixed to the body only with a single direction air connection adapter fixing screw (10). Besides this, by means of the air inlet connection adapter (9) alternatives such that the air connections to the cylinder independent from the adapter plate (1) can have different threads are provided.

Within the scope of this basic concept, it is possible to develop many various applications of the connection ring non-detachable connection method in emergency brake cylinders subject to the invention and the invention cannot be delimited with the illustrations described herein and principally the invention is as defined in the claims.

The invention claimed is:

1. An emergency brake cylinder, comprising:
an emergency body, and
a service body;
wherein the emergency body and the service body are coupled by a curve shaped connection ring; the curve shaped connection ring is placed on the service body,
wherein the emergency body connects with an adapter plate; following the installation of the adapter plate on the emergency body, the emergency body and the service body are connected to each other, and the connection of the emergency body to the service body is a non-detachable connection provided by the curve shaped connection ring;
wherein the emergency brake cylinder further comprises a single piece air connection adapter;
wherein the single piece air connection adapter comprises two air connections, the single piece air connection adapter is fixed with an additional air connection adapter fixing screw following the installation of the curve shaped connection ring having a plurality of air connection sockets for the single piece air connection adapter.

2. The emergency brake cylinder of claim 1, wherein the curve shaped connection ring has been formed before the curve shaped connection ring is placed on the emergency brake cylinder.

3. The emergency brake cylinder of claim 1, wherein the curve shaped connection ring has not been formed before the curve shaped connection ring is placed on the emergency brake cylinder.

4. The emergency brake cylinder of claim 1, wherein the curve shaped connection ring is formed by placing a service chamber on a diaphragm located on a emergency chamber; wherein the service chamber is located in a upper mould and the emergency chamber is located in a lower mould, a shape of the curve shaped connection ring is changed by rotating the upper mould and the lower mould.

5. The emergency brake cylinder of claim 4, wherein a non-detachable connection in diaphragm-piston type brake cylinders is provided by the curve shaped connection ring for the emergency chamber on its own.

6. The emergency brake cylinder of claim 1, wherein the connection between the emergency body and service body is impermeable.

7. The emergency brake cylinder of claim 1, wherein the two air connections are placed over the adapter plate.

8. The emergency brake cylinder of claim 1, wherein only the curve shaped connection ring is coated with a zinc based coating which is resistant to abrasion and corrosion.

9. The emergency brake cylinder of claim 1, wherein the emergency body is coated through non-galvanized methods.

10. A method of shaping a curve shaped connection ring of an emergency brake cylinder comprising an emergency body and a service body; wherein the emergency body and the service body are coupled by the curve shaped connection ring; the curve shaped connection ring is placed on the service body, wherein the emergency body connects with an adapter plate; following the installation of the adapter plate on the emergency body, the emergency body and the service body are connected to each other, and the connection of the emergency body to the service body is a non-detachable connection that is provided by the curve shaped connection ring;
wherein the emergency brake cylinder further comprises a single piece air connection adapter;
wherein the single piece air connection adapter comprises two air connections, the single piece air connection adapter is fixed with an additional air connection adapter fixing screw following the installation of the curve shaped connection ring having a plurality of air connection sockets for the single piece air connection adapter;
wherein the method comprises:
placing the adapter plate into a lower mould together with an emergency chamber after inner accessories of the emergency chamber are mounted,
placing the curve shaped connection ring on a service chamber following the installation of its inner accessories, wherein the curve shaped connection ring has a larger diameter than the service chamber,
placing the service chamber in an upper mould,
placing a diaphragm on the adapter plate within the emergency chamber which inside the lower mould,
mounting the service chamber within the upper mould over a diaphragm, wherein the diaphragm is located on the emergency chamber inside the lower mould, and
bending and shaping the curve shaped connection ring over the emergency and service bodies by applying a force on the curve shaped connection ring by means of the upper mould.

11. A method of shaping a curve shaped connection ring of an emergency brake cylinder comprising an emergency body and a service body; wherein the emergency body and the service body are coupled by the curve shaped connection ring; the curve shaped connection ring is placed on the service body, wherein the emergency body connects with an adapter plate, and following the installation of the adapter plate on the emergency body, the emergency body and the service body are connected to each other, and the connection of emergency body to the service body is a non-detachable connection that is provided by the curve shaped connection ring;

wherein the method comprises:

placing the adapter plate into a lower mould together with an emergency chamber after inner accessories of the emergency chamber are mounted, placing the curve shaped connection ring on a service chamber following the installation of its inner accessories, wherein the curve shaped connection ring has a larger diameter than the service chamber, placing the service chamber in an upper mould, placing the upper mould on a diaphragm, wherein the diaphragm is located on the emergency chamber, wherein the emergency chamber is located in the lower mould, rotating a mould that combined the upper mould and the lower mould around its own axis at a certain cycle, wherein the curve shaped connection ring of a form spool which is movable at a linear direction bends the skirt section of the curve shaped connection ring towards the emergency body and thus the curve shaped connection ring is shaped.

* * * * *